Figure 1:
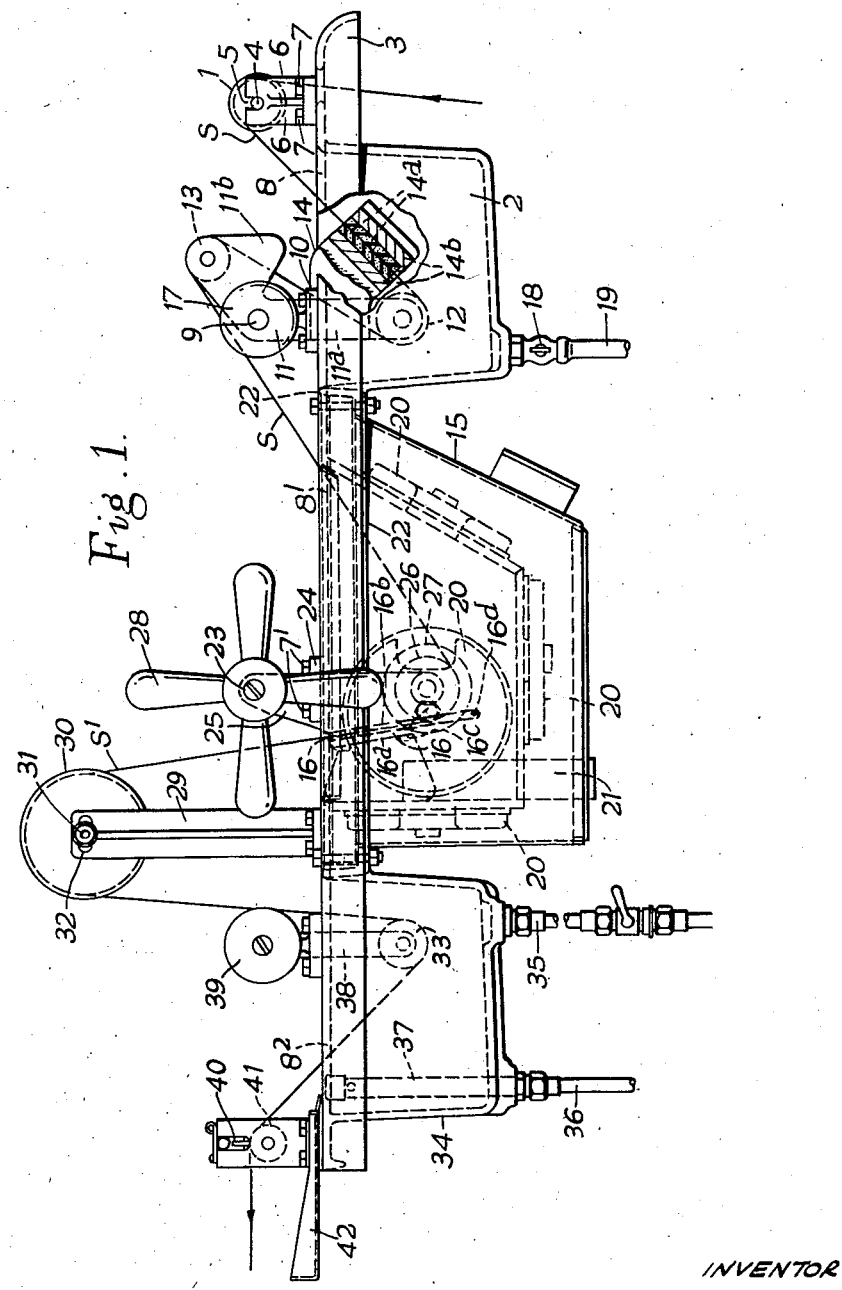

Sept. 17, 1957 J. W. LAWRENCE 2,806,445
TINNING APPARATUS FOR STRIP METAL
Filed Sept. 27, 1955 4 Sheets-Sheet 1

INVENTOR
J. W. Lawrence
BY
Richardy Geier
ATTORNEYS

Sept 17, 1957 J. W. LAWRENCE 2,806,445
TINNING APPARATUS FOR STRIP METAL
Filed Sept. 27, 1955 4 Sheets-Sheet 3

INVENTOR
J. W. Lawrence
BY
ATTORNEYS

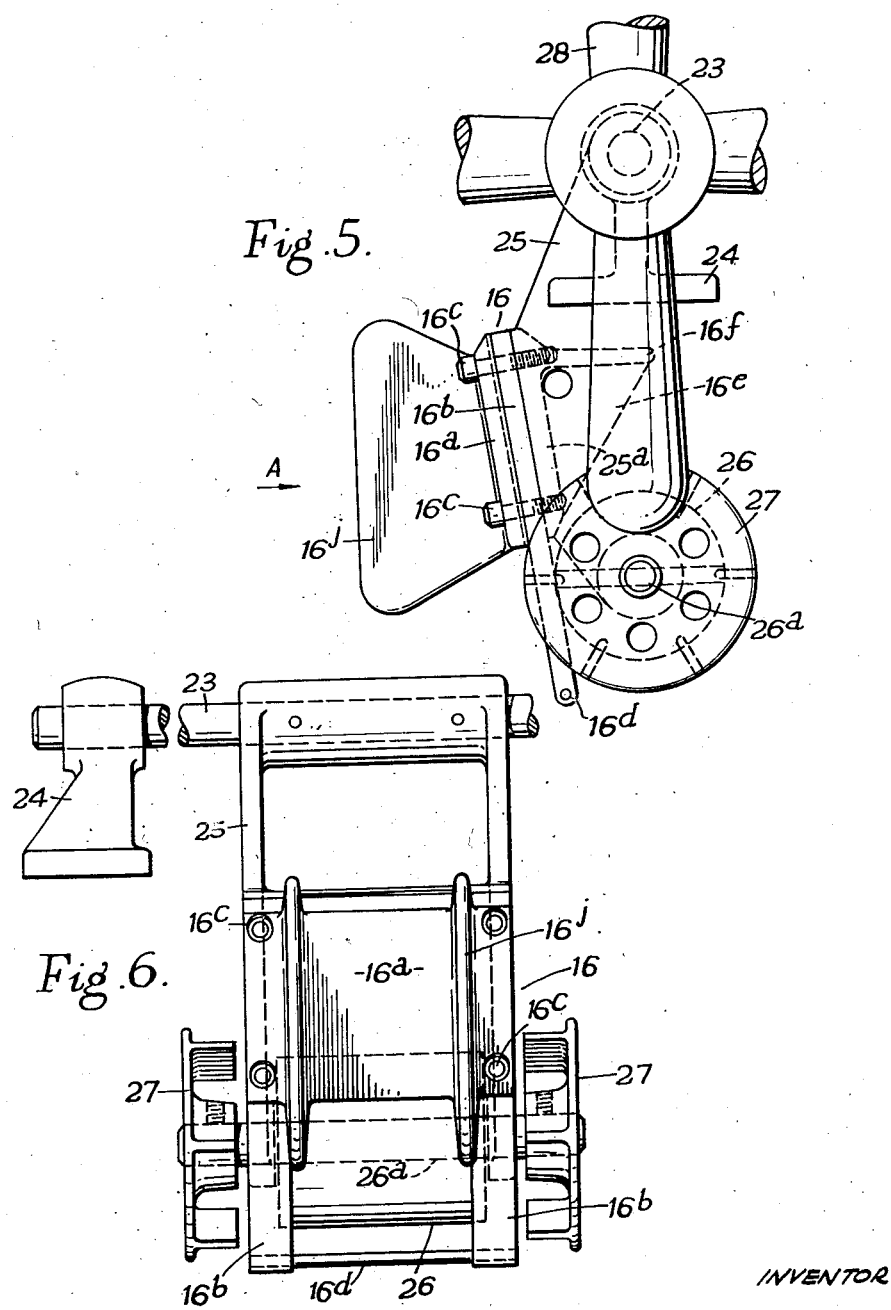

United States Patent Office 2,806,445
Patented Sept. 17, 1957

2,806,445

TINNING APPARATUS FOR STRIP METAL

John William Lawrence, Leicester, England, assignor to Lawrence Holdings (Overseas) Limited, London, England Application September 27, 1955, Serial No. 536,977

6 Claims. (Cl. 118—69)

This invention appertains to apparatus for "tinning," i. e. coating with solder, a flat and flexible strip of relatively thin and easily deformable metal or alloy, e. g. mild steel or brass.

Tinned strip metal of this character is, for instance, employed in the production of lock seamed tubes for use in the construction of core structures of the finned tube type.

Finned tube core structures are embodied in heat exchange apparatus such, for example, as radiators for use in conjunction with liquid cooled internal combustion engines, and are alternatively known as cores of the "gilled tube" or "fin and tube" type.

The invention, moreover, has reference particularly to tinning apparatus of the generally known kind including, in combination, a flux bath, a heated solder bath, means for the support of a coil of metal strip, means for continuously drawing the strip from the coil and guiding it through the said baths, a device in association with the solder bath for determining the thickness of the coating of solder on the opposite sides of the strip, and means for finally washing the coated strip.

Heretofore, in a tinning apparatus of this kind, solder picked up from the oxidised surface of the solder bath tends to become applied to the surfaces of the travelling metal strip thereby resulting in an inferior coating. Moreover, in certain prior forms of such apparatus, the means used to determine the thickness of the coating function to scrape solder off the strip. Scraping is not conducive to the promotion of a smooth and uniformly thick coating.

The primary object of the present invention is to provide, in the solder bath of a tinning apparatus of the kind herein referred to, an improved device of a particularly simple and efficient character designed not only to control the thickness of the solder coating, without scraping, but also to prevent the picking up of oxidised solder from the surface of the solder bath.

The invention also provides other improvements in such an apparatus having for their object to facilitate threading-up of the metal strip, and enable the latter to be readily withdrawn from the solder bath as occasion may demand.

According to the principal feature of the invention, there is provided, between a guide roller within the solder bath and a further roller located exteriorly of the latter, a longitudinally slotted component through which are arranged to pass successive portions of travelling metal strip extending between the said rollers, a lower portion of the said component being immersed within the solder in the bath whilst the remaining upper portion thereof extends above the surface of this solder.

The said longitudinally slotted component within the solder bath is technically termed and will for convenience be hereinafter referred to in this specification and in the appended claims as, a "shoe." This shoe is uniformly slotted from end to end, the width of the slot, which is shallow, corresponding approximately to the width of the metal strip to be tinned.

As it progressively passes through the shoe, the metal strip extends along the median plane between the opposing flat surfaces of the interior of the shoe defining the depth of the longitudinal slot.

The lower portion of the shoe immersed within the solder bath serves to prevent coagulated impurities from adhering to the travelling strip. Solder from the bath continuously moves up into and along the upper portion of the shoe by capillary attraction, and this solder coats both sides of the metal strip passing through it. It is to be clearly understood that no solder is scraped off the strip by the upper portion of the shoe.

The provision of the shoe also prevents oxidised surface solder from getting onto the strip: this is due to the fact that the end of the slot in the upper portion of the shoe extending above this surface is isolated from the latter, and because solder which travels up the slot by capillary attraction is drawn from beneath the said surface.

In a convenient embodiment of the invention the spindle of or trunnions on the guide roller ("solder roller") accommodated within the solder bath is or are mounted for rotation in bearings provided in a suitably pivoted carrier by which the shoe is also carried, and means are provided for swinging this carrier upwardly about its pivot suchwise as to move the solder roller and the shoe out of the bath and so position these as to facilitate threading up preparatory to a run.

Upon the ends of the spindle or trunnions of the solder roller may be fitted blades or the like, e. g. embodied in appropriately bladed paddle wheels, which rotate together with the solder roller and are adapted to stir up the solder in the pot for the purposes of evening out the temperature and dispersing the grannular or pasty copper-tin alloy and other metallic compounds which are found in small quantities when copper-bearing strip is passing through the solder. Such granules, unless dispersed, would tend to form around or drift to the shoe inlet and there foul the strip surface and prevent the formation of a uniform coating of solder.

So that the solder within the slot in the shoe shall remain hot at such times as the shoe is held clear of the bath as just described, the shoe may, if desired, although this feature is not essential, be provided with heat-conducting ribs or similar protuberances adapted to be permanently immersed in the heated solder bath. That is to say, even when the solder roller and the associated shoe are withdrawn for threading up, heat from the bath is conducted to the interior of the shoe and maintains the assembly in a heated condition to facilitate restarting of the tinning process.

Figure 2:
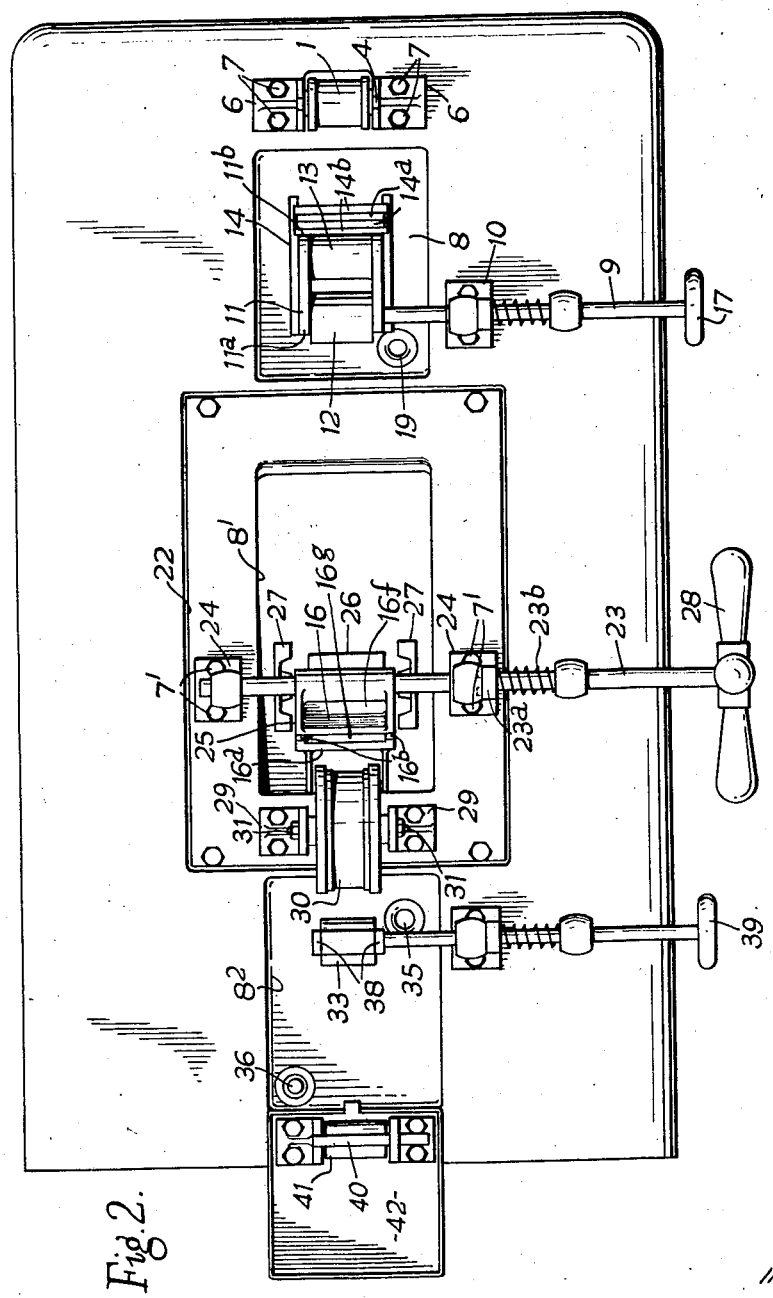
Figure 3:
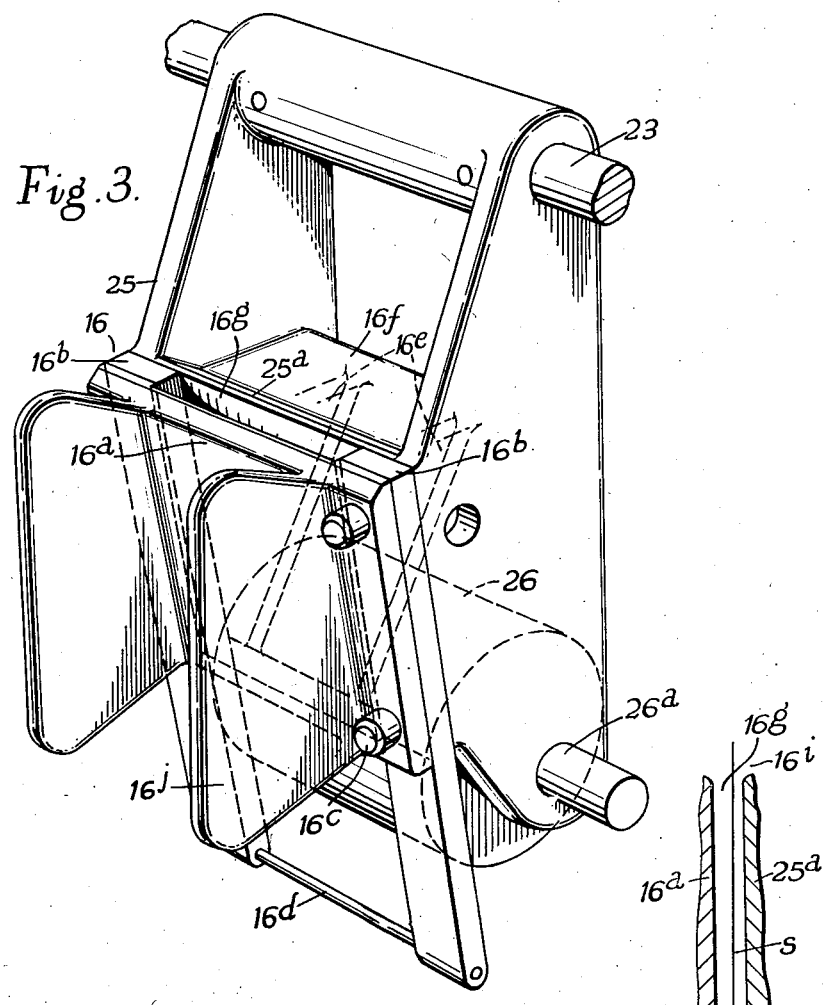
Figure 4:
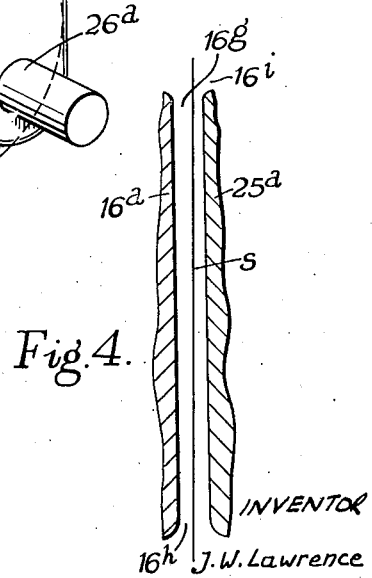

In order that the invention may be more clearly understood and readily carried into practical effect, a constructional example of the improved tinning plant will now be described with reference to the accompanying drawings, wherein, Figure 1 is an elevational view of the said plant, Figure 2 is a plan view of the same, Figure 3 is a detail perspective view showing the pivoted support and the shoe carried thereby, and Figure 4 is a detail cross-sectional view through the shoe, Figure 5 is a detail side view, drawn to a larger scale, of the pivoted support and shoe, and Figure 6 is a front end view of the same as seen in the direction of the arrow A in Figure 5.

Like parts are designated by similar reference characters throughout the drawings.

In the illustrated plant brass or other suitable strip metal indicated at S (Figure 1) is continuously drawn by driven rollers from a reel-supported coil (not shown) and passes over a guide roller 1 into a flux bath 2. The various components of the apparatus are erected upon and supported by a horizontally disposed rectangular support 3. Thus, trunnions 4 on the guide roller 1 are mounted in vertical slots 5 formed in a pair of angular brackets 6 secured by screws 7 upon one end of the horizontal support 3. Adjacent to this guide roller 1 and its brackets 6 a rectangular opening 8 is formed in the support 3, this opening leading into the flux bath 2 which is located below the said support. Extending transversely across the horizontal support 3, at a suitable height above the latter, is a spindle 9 which is mounted to turn in another bracket 10 screwed to the said support. The inner end of this spindle is located above the flux bath 2 and is attached to a pair of rigidly connected and laterally spaced two-armed levers 11. The major arms 11a of these levers are vertically disposed and at their lower ends carry a guide roller 12 located within the flux bath 2. A further roller 13, located above and well clear of the flux bath 2, is similarly carried by the upper ends of the levers 11.

Adjoining this further, i. e. upper, roller 13 the upwardly extending arms of the levers 11 are formed with downwardly directed lugs 11b (Figure 1) serving as guides to locate and maintain the strip metal S accurately upon the said roller. Intermediate their ends, the vertically disposed arms 11a have secured to the outer sides thereof a pair of spaced rearwardly directed extensions 14 having downwardly inclined rear ends between which is mounted a wiper device for fluxing the strip S, this device comprising a pair of wiper elements 14a of sponge rubber or equivalent material between which the strip passes. The wiper elements 14a are held between opposed holder jaws 14b mounted at their ends in recesses in the extensions 14. Hence the travelling strip S passes between the wiper elements 14a for fluxing, under the guide roller 12 within the flux bath 2 and then over the upper roller 13 from whence it passes downwards again into a solder pot 15 arranged beneath the horizontal support 3. A further rectangular opening 8¹ in the support leads into the solder pot 15. Before passing into the latter, surplus flux may, if desired, be removed from the travelling strip 3, by means of a squeegee arranged for co-operation with the roller 13. The outer end of the spindle 9 is furnished with a knob 17 or equivalent whereby the connected levers 11 can be readily turned to swing the bottom flux roller 12 up and withdraw it from the flux for threading up. A test cock 18 and a drain tube 19 may conveniently be fitted to the bottom of the flux bath 2.

Electrical heating elements 20 and an associated thermostat located at 21 (see Figure 1) are fitted within the holder pot 15 which, at its upper end, is embraced by a shroud 22. Rigid with and suspended from a second transversely extending spindle 23 mounted to turn in brackets 24 secured by screws 7¹ upon the top of the horizontal support 3 is a suitably formed or bifurcated cast carrier component 25 which extends vertically downwards well into the solder pot 15. This component (shown more clearly in Figure 3) carries the longitudinally slotted shoe 16, which is nearly upright but inclined forwards. At its lower end the carrier component 25 is journalled to receive the spindle 26a of (or trunnions on) a bottom guide roller 26. This roller 26 may be of steel, or of any other appropriate metal, or suitably treated non-metallic substance, e. g. porcelain or graphite to which molten solder will not readily adhere. To the ends of the spindle of or trunnions on the said bottom guide roller 26 are rigidly secured appropriately bladed paddle wheels 27 (see Figures 5 and 6) which rotate together with the bottom roller and are adapted to stir up the solder in the pot 15 for the purposes hereinbefore mentioned.

The shoe 16 in this example comprises, as illustrated more clearly in Figures 4 and 5, a cast front plate 16a and a complementary rear plate 25a constituted by an integral flat web portion of the forked carrier component 25 serving, incidentally, to connect the spaced downwardly extending limbs thereof. The front and rear plates of the shoe 16 are spaced apart by parallel distance pieces 16b, the said front plate and the distance pieces being secured together and to the rear plate 25a by means of screws 16c. The lower ends of the distance pieces project beneath the bottom guide roller 26 and are connected by a spindle 16d. The inner face of the front plate 16a may be flat, or it may, if desired, and as shown, have formed therein a shallow, parallel-sided and open-ended channel extending from end to end of the shoe. The back side of the rear plate 25a is reinforced by webs 16e and 16f. Thus the opposed rear and front faces of the front and rear plates 16a and 25a respectively together with the inner sides of the suitably spaced and parallel distance pieces 16b defined between them a slot 16g (Figure 3) of the character hereinbefore described. This slot is rectangular both in longitudinal and transverse section. For a slot having a width of say, 2⅛″, the depth may be approximately ¼″. The upper and lower edges of the front and rear plates 16a and 25a may advantageously be slightly radiused or chamfered so as to provide a flared entrance 16h into, and a flared exit 16i from, the slot 16g as depicted in Figure 4. On the outer face of the front plate 16a are provided relatively thin heat-conducting ribs 16j of substantial area.

The outer end of the spindle 23 is furnished with a knob, wheel or handle such as 28 by means of which it can be turned to swing up the shoe 16 and the bottom guide roller 26 and so withdraw these parts from the solder to facilitate threading up. When the shoe 16 is withdrawn in this way, the ribs 16j remain immersed in the sodler or substantially so.

To enable the carrier component 25 to be accurately located in position, with the shoe 16 at the correct inclination, at such times as the knob, wheel or handle 28 is turned to lower the bottom guide roller 26 into the solder pot 15, after threading up, there is provided a locating clutch device 23a mounted on the spindle 23 (see Figure 2) and furnished with dogs for engagement in notches in the adjacent bearing bracket 24. The clutch device 23a is urged towards the said bracket by means of a compression spring 23b.

Between a pair of tall brackets 29 mounted on the horizontal support 3 at a location adjacent to the exit end of the solder pot 15 is a plain top roller 30 over which the strip S, having travelled around and beneath the roller 26 in the pot and emerged from the shoe 16 is passed. Here again, the top of said roller may be of steel or of any other appropriate metal, or suitably treated with non-metallic substance, e. g. porcelain or graphite, to which molten solder will not readily adhere. The spindle of, or trunnions 31 on, the top roller 30 is or are adjustable back and forth in slots 32 formed in the upper ends of the tall brackets 29 so as to vary the inclination of the straight portion S¹ (see Figure 1) of the travelling strip S extending between the bottom and top rollers 26 and 30. In this way it is possible to centralize the strip within the shoe 16 so that the coating of solder is of substantially the same thickness on both sides of the strip.

From the top roller 30 the tinned metal strip S extends down and around the underside of a water roller 33 located in a bath 34 adapted to contain cooling water for washing surplus flux off the strip. A third rectangular opening 8² in the support 3 leads into the water bath 34 and the water in the latter is changed and kept fresh by arranging for a continuous flow into and out of the bath through pipes 35 and 36 respectively. Associated with the water outlet pipe 36 is an overflow pipe 37. The water roller 33 is mounted between the arms 38 of a forked member adapted to be swung up by a knob 39 or equivalent in a similar manner to and for the same purpose as the corresponding members carrying the other withdrawable rollers.

At the exit side of the water bath 34 there may, as shown in Figures 1 and 2, be provided a device 40 for wiping the water from the tinned strip as it passes over a roller 41. At 42 is indicated a drip tray.

The pair of levers 11, and the arms 38 of the appropriate forked member, may conveniently be locked in their operative, i. e. down, positions by means of clutch devices such as that hereinbefore described with reference to the spindle 23.

I claim:

1. A tinning apparatus for coating with solder a flat and flexible strip of thin and deformable metal comprising, in combination, a flux bath, a lower roller in, and an upper roller above, the said flux bath for guidance of a travelling metal strip during and immediately after its passage through flux contained in said bath, a pair of rigidly connected and laterally spaced levers between which said lower and upper rollers are mounted, a spindle to which said levers are secured, a member enabling the spindle to be turned to swing up the lower roller and withdraw it from the flux for threading up, a solder pot disposed adjacent to the flux bath, means adapted to heat solder contained in said pot, a bottom guide roller within the solder pot and a top roller located above and clear of said pot, a pivoted carrier for said bottom guide roller which carrier extends down into the solder pot and is furnished with bearings for the bottom guide roller spindle, a shoe which is also carried by said carrier and arranged with its lower portion immersed in the solder and its upper portion extending above the surface of the latter, said shoe being uniformly slotted from end to end to permit of the passage therethrough of successive portions of the travelling metal strip extending between the bottom guide roller in the solder pot and the top roller above the latter, and the slot being shallow and of a width corresponding to that of the strip, the arrangement of the shoe in relation to the rollers in and above the solder pot being such that the strip extends along the median plane between opposing flat surfaces of the interior of the shoe defining the depth of the longitudinal slot whereby solder drawn from beneath the surface in the pot and travelling up the slot coats both sides of the strip, means enabling the carrier to be swung upwardly about its pivot so as to move the bottom guide roller and the shoe out of the solder pot for the purpose of facilitating threading up, and means washing the coated strip.

2. A tinning apparatus according to claim 1, wherein the pair of rigidly connected and laterally spaced levers are provided with supports for resilient wiper elements between which the metal strip is arranged to pass for fluxing.

3. A tinning apparatus according to claim 1, which includes a further bath containing water for washing surplus flux off the strip, said bath being equipped with means whereby the water can be changed by continuous flow of water into and out of the said bath, and with a roller around which the travelling strip passes, said water roller being mounted in a member adapted to be swung up to withdraw the roller from the water for threading up.

4. A tinning apparatus for coating with solder a flat and flexible strip of thin and deformable metal comprising, in combination, a flux bath, an adjacently disposed solder pot, means adapted to heat solder contained in said pot, means for guiding a travelling metal strip first through the said flux bath and then through the solder pot, said means including a guide roller mounted on a spindle within the solder pot, and a further roller located above and clear of said pot, a pivoted carrier for the guide roller which carrier extends down into the solder pot and is furnished with bearings for the spindle of said roller, bladed paddle wheels fitted upon the ends of the spindle of the guide roller in the solder pot and arranged to rotate together with said roller so as to stir up the solder in the pot, a shoe which is also carried by said carrier and arranged with its lower portion immersed in the solder and its upper portion extending above the surface of the latter, said shoe being uniformly slotted from end to end to permit of the passage therethrough of successive portions of the travelling metal strip extending between the said two rollers, and the slot being shallow and of a width corresponding to that of the strip, the arrangement of the shoe in relation to the rollers being such that the strip extends along the median plane between opposing flat surfaces of the interior of the shoe defining the depth of the longitudinal slot whereby solder drawn from beneath the surface in the pot and travelling up the slot coats both sides of the strip, means enabling the carrier to be swung upwardly about its pivot so as to move the appropriate guide roller and the shoe out of the solder pot for the purpose specified, and means for washing the coated strip.

5. A tinning apparatus for coating with solder a flat and flexible strip of thin and deformable metal comprising, in combination, a flux bath, an adjacently disposed solder pot, means adapted to heat solder contained in said pot, means for guiding a travelling metal strip first through the said flux bath and then through the solder pot, said means including a guide roller mounted on a spindle within the solder pot, and a further roller located above and clear of said pot, a pivoted carrier for the guide roller which carrier extends down into the solder pot and is furnished with bearings for the spindle of said roller, a shoe which is also carried by said carrier and arranged with its lower portion immersed in the solder and its upper portion extending above the surface of the latter, the appropriate face of the shoe being provided with heat conducting ribs arranged so as to be permanently immersed in the solder, said shoe being uniformly slotted from end to end to permit of the passage therethrough of successive portions of the travelling metal strip extending between the said two rollers, and the slot being shallow and of a width corresponding to that of the strip, the arrangement of the shoe in relation to the rollers being such that the strip extends along the median plane between opposing flat surfaces of the interior of the shoe defining the depth of the longitudinal slot whereby solder drawn from beneath the surface in the pot and travelling up the slot coats both sides of the strip, means enabling the carrier to be swung upwardly about its pivot so as to move the appropriate guide roller and the shoe out of the solder pot for the purpose specified, and means for washing the coated strip.

6. A tinning apparatus for coating with solder a flat and flexible strip of thin and deformable metal comprising, in combination, a flux bath, an adjacently disposed solder pot, means adapted to heat solder contained in said pot, means for guiding a travelling metal strip first through the said flux bath and then through the solder pot, said means including a guide roller mounted on a spindle within the solder pot, and a further roller located above and clear of said pot, a pivoted carrier for the guide roller which carrier extends down into the solder pot and is furnished with bearings for the spindle of said roller, a shoe which is also carried by said carrier and arranged with its lower portion immersed in the solder and its upper portion extending above the surface of the latter, said shoe being uniformly slotted from end to end to permit of the passage therethrough of successive portions of the travelling metal strip extending between the said two rollers, and the slot being shallow and of a width corresponding to that of the strip, the shoe comprising spaced front and rear plates which are secured together with distance pieces between them so as to form a shallow, parallel-sided and open-ended slot extending from end to end of the shoe, the lower edges of these plates being radiused to provide a flared entrance into the slot, the arrangement of the shoe in relation to the rollers being such that the strip extends along the median plane between opposing flat surfaces of the interior of the shoe defining the depth of the longitudinal slot whereby solder drawn from beneath the surface in the pot and travelling up the slot coats both sides of the strip, means enabling the carrier to be swung upwardly about its pivot so as to move the appropriate guide roller and the shoe out of the solder pot for the purpose specified, and means for washing the coated strip.

References Cited in the file of this patent

UNITED STATES PATENTS

| | | |
|---|---|---|
| 943,315 | Niedringhaus | Dec. 14, 1909 |
| 1,400,310 | Nicholls | Dec. 13, 1921 |
| 1,526,899 | Bundy | Feb. 17, 1925 |
| 1,880,078 | Eisner | Sept. 27, 1932 |
| 2,183,890 | Matteson et al. | Dec. 19, 1939 |
| 2,192,789 | Harter | Mar. 5, 1940 |
| 2,197,622 | Sendzimir | Apr. 16, 1940 |
| 2,348,384 | Hillman | May 9, 1944 |